United States Patent
Kojima

(10) Patent No.: US 7,961,248 B2
(45) Date of Patent: Jun. 14, 2011

(54) IMAGE PICKUP APPARATUS HAVING BATTERY DISPLAY WHICH ACCOUNTS FOR IMAGE CAPTURING MODE OR SETTING STATUS

(75) Inventor: Teruyuki Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 11/972,800

(22) Filed: Jan. 11, 2008

(65) Prior Publication Data

US 2008/0180548 A1 Jul. 31, 2008

(30) Foreign Application Priority Data

Jan. 26, 2007 (JP) ................ 2007-016509

(51) Int. Cl.
*H04N 5/225* (2006.01)
*H04N 5/222* (2006.01)
(52) U.S. Cl. ............... 348/372; 348/222.1; 348/333.02
(58) Field of Classification Search ............ 348/333.13, 348/372, 333.02
See application file for complete search history.

(56) References Cited

U.S. PATENT DOCUMENTS

| 5,659,807 A * | 8/1997 | Nakamura et al. ............ 396/55 |
| 6,710,809 B1 * | 3/2004 | Niikawa ..................... 348/372 |
| 7,102,685 B2 * | 9/2006 | Nishimura ................. 348/372 |
| 7,113,204 B2 * | 9/2006 | Eto et al. ............... 348/208.99 |
| 2005/0062878 A1 * | 3/2005 | Ogawa et al. .............. 348/372 |

FOREIGN PATENT DOCUMENTS

| JP | 5-25102 A | | 2/1993 |
| JP | 10-341536 | * | 12/1998 |
| JP | 2001-154254 | * | 6/2001 |
| JP | 2001-126778 A | | 11/2001 |

* cited by examiner

*Primary Examiner* — Ngoc-Yen T Vu
(74) *Attorney, Agent, or Firm* — Canon USA, Inc. IP Div

(57) ABSTRACT

In an electronic image pickup apparatus, if a mode used and some of setting values of additional functions are changed, a camera control microprocessor computes the number of images that can be captured on the basis of a current consumption integrated value that has been computed by a current integrating unit and stored in a storage unit, updates data of the number of images that can be captured using the computation result, and performs control processing so as to cause a display unit to display the updated data.

4 Claims, 4 Drawing Sheets

```
CURRENT BATTERY INFORMATION
------------------------------------------------------------
ESTIMATED BATTERY RESIDUAL CAPACITY        : Py[mAh]
TOTAL BATTERY CAPACITY                     : Ps[mAh]
INTEGRATED AMOUNT OF CURRENT               : Pr[mAh]
QR TIMER PERIOD OF TIME                    : Tqr[s] ×   Iqr[mA]
AUTO POWER OFF TIMER                       : Tapo[s] × Iapo[mA]
IS SWITCH(ON)                              : Pis on[mAh]
AF SWITCH (ON)                             : Paf on[mAh]
CURRENT CONSUMPTION INTEGRATED VALUE
REQUIRED FOR IMAGE CAPTURING OF SINGLE FRAME : Pw[mAh]
------------------------------------------------------------
NUMBER OF IMAGES THAT CAN BE CAPTURED      : N[TIMES]
```

FIG. 4A

```
CURRENT BATTERY INFORMATION
-----------------------------------------------------------------
ESTIMATED BATTERY RESIDUAL CAPACITY              : Py[mAh]
TOTAL BATTERY CAPACITY                           : Ps[mAh]
INTEGRATED AMOUNT OF CURRENT                     : Pr[mAh]
QR TIMER PERIOD OF TIME                          : Tqr[s] ×    Iqr[mA]
AUTO POWER OFF TIMER                             : Tapo[s] ×   Iapo[mA]
IS SWITCH(ON)                                    : Pis on[mAh]
AF SWITCH (ON)                                   : Paf on[mAh]
CURRENT CONSUMPTION INTEGRATED VALUE
REQUIRED FOR IMAGE CAPTURING OF SINGLE FRAME     : Pw[mAh]
-----------------------------------------------------------------
NUMBER OF IMAGES THAT CAN BE CAPTURED            : N[TIMES]
```

FIG. 4B

```
CURRENT BATTERY INFORMATION
-----------------------------------------------------------------
ESTIMATED BATTERY RESIDUAL CAPACITY              : Py[mAh]
TOTAL BATTERY CAPACITY                           : Ps[mAh]
INTEGRATED AMOUNT OF CURRENT                     : Pr[mAh]
QR TIMER PERIOD OF TIME                          : Tqr'[s] ×   Iqr[mA]
AUTO POWER OFF TIMER                             : Tapo[s] ×   Iapo[mA]
IS SWITCH(OFF)                                   : Pis off[mAh]
AF SWITCH(OFF)                                   : Paf off[mAh]
CURRENT CONSUMPTION INTEGRATED VALUE
REQUIRED FOR IMAGE CAPTURING OF SINGLE FRAME     : Pw'[mAh]
-----------------------------------------------------------------
NUMBER OF IMAGES THAT CAN BE CAPTURED            : N'[TIMES]
```

IMAGE PICKUP APPARATUS HAVING BATTERY DISPLAY WHICH ACCOUNTS FOR IMAGE CAPTURING MODE OR SETTING STATUS

BACKGROUND OF THE INVENTION

1. Field of the Invention

The present invention relates to image pickup apparatuses such as digital single-lens reflex cameras that use a battery as a power source.

2. Description of the Related Art

Battery residual capacity display devices for electronic image pickup apparatuses have been proposed. In some of such battery residual capacity display devices, a dummy resistor is connected between a battery and a circuit included in the battery residual capacity display device. A voltage is measured when a current is passed through the dummy resistor. A battery residual capacity corresponding to the measured voltage is displayed by referring to a camera storage value and a battery residual capacity display table.

Japanese Patent Laid-Open No. 2001-126778 discloses a battery residual capacity determination device having a subtable for each of a plurality of additional functions. The subtable details the correspondence between a battery temperature and a battery voltage drop. A battery voltage correction value is obtained on the basis of a battery temperature and a current battery residual capacity level. The obtained correction value is added to a measured battery voltage for battery voltage correction. This battery residual capacity determination device can improve the measurement accuracy of a battery residual capacity.

Examples of electronic image pickup apparatuses with battery replacement period display devices include a camera that stores in advance the number of times image capturing can be performed with a battery being used, adds up the number of times image capturing was performed with the battery, compares these values each time image capturing is performed, and displays a notification that the battery should be replaced when the difference between these values is equal to or smaller than a predetermined value.

Japanese Patent Publication No. 5-25102 discloses a camera that stores the number of times image capturing can be performed with a battery in a non-flash mode, represents the capacity of the battery as the product of N and the power consumption per single image capturing operation in the non-flash mode, and represents power consumption per single image capturing operation in a flash mode as the product of n and the power consumption per single image capturing operation in the non-flash mode. If the image capturing mode is the non-flash mode, a value representing the battery capacity is rewritten as N−1 each time the image capturing operation is performed and is then stored. If the image capturing mode is the flash mode, the value representing the battery capacity is rewritten as N−n each time the image capturing operation is performed and is then stored. Thus, this camera can display, in a plurality of image capturing modes, the number of times image capturing can be performed and the battery residual capacity.

In the case of the battery residual capacity determination method disclosed in Japanese Patent Laid-Open No. 2001-126778, current and power consumption at the time of image capturing are not taken into consideration when a battery voltage is measured. Accordingly, the power consumption of a battery cannot be measured and displayed. Furthermore, the number of images that can be captured with the battery, which represents the available power of the battery, cannot be determined and displayed.

In the case of the battery residual capacity determination method disclosed in Japanese Patent Publication No. 5-25102, the number of times image capturing can be performed with a battery is displayed in a plurality of image capturing modes. However, the integrated value of the current used for image capturing is not taken into consideration. Accordingly, if power consumption per single image capturing operation varies, for example, if an attached interchangeable lens is changed and power consumption required for an image capturing operation is therefore changed, the available power of the battery does not correspond to the displayed number of times image capturing can be performed with the battery. This decreases the accuracy of the counting of the number of images that can be captured.

SUMMARY OF THE INVENTION

The present invention provides an image pickup apparatus capable of accurately counting and displaying the number of images that can be captured with a battery as the available power of the battery even if the amount of power consumption is changed in accordance with an image capturing mode used or a setting status desired by the photographer.

An image pickup apparatus according to an embodiment of the present invention includes a current integrating unit configured to measure a current supplied from a battery, and compute a current consumption integrated value on the basis of a power consumption period and the measured current; an additional function setting unit configured to turn on or off an additional function regarding an image capturing operation; a storage unit configured to store the current consumption integrated value obtained by the current integrating unit when the additional function is turned on or off; and a computation unit configured to compute the number of images that can be captured on the basis of the current consumption integrated value corresponding to a setting state of the additional function.

Further features and aspects of the present invention will become apparent from the following description of exemplary embodiments with reference to the attached drawings.

BRIEF DESCRIPTION OF THE DRAWINGS

FIGS. 4A and 4B are diagrams illustrating display examples displayed on a display unit illustrated in FIG. 1 according to an exemplary embodiment of the present invention.

DESCRIPTION OF THE EMBODIMENTS

Embodiments of the present invention will now herein be described in detail with reference to the accompanying drawings.

Figure 1:
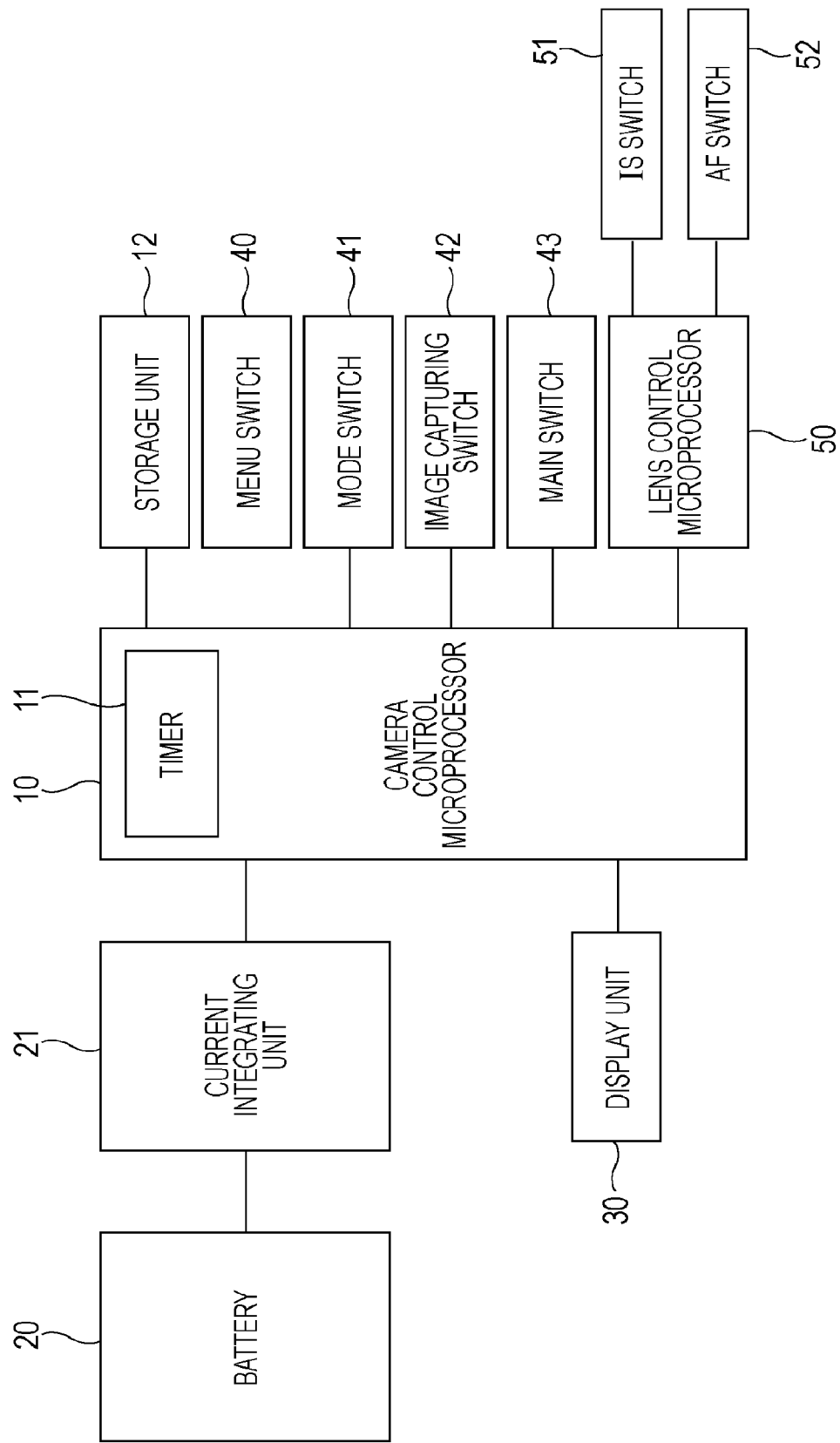
FIG. 1 is a block diagram illustrating an example system configuration of an electronic image pickup apparatus (digital single-lens reflex camera) according to an exemplary embodiment of the present invention.

FIG. 1 is a block diagram illustrating an example system configuration of an electronic image pickup apparatus (digital single-lens reflex camera) according to an exemplary embodiment of the present invention.

Referring to FIG. 1, the digital single-lens reflex camera includes a cameracontrol microprocessor 10 as a main component and other following components. The cameracontrol microprocessor 10 controls the digital single-lens reflex camera, and includes, for example, a CPU, a ROM, and a RAM. A timer 11 included in the cameracontrol microprocessor 10 measures a time control period of the camera.

A storage unit 12 is connected to the cameracontrol microprocessor 10, and stores various pieces of camera setting information. A battery 20 is a power source for supplying power to each unit included in the camera. A current integrating unit 21 is connected to a circuit included in the camera, measures a current supplied from the battery 20, and calculates a current consumption integrated value on the basis of a power consumption period and the measured current.

The current integrating unit 21 sends pieces of battery data, for example, the total capacity [mAh], the residual capacity [mAh], a battery voltage [v], and a battery current [mA], to the cameracontrol microprocessor 10.

A display unit 30 includes a TFT control circuit, a TFT monitor, a TFT backlight, and an image display memory. The cameracontrol microprocessor 10 is connected to a menu switch 40, a mode switch 41, an image capturing switch 42, and a main switch 43. When the main switch 43 is turned on, the camera is started.

The cameracontrol microprocessor 10 performs data communication with a lens control microprocessor 50 via a lens connection interface. For example, various pieces of lens control data such as lens aperture control data, zoom control information, and lens driving amount control information, are exchanged between the cameracontrol microprocessor 10 and the lens control microprocessor 50.

An IS switch 51 is connected to the lens control microprocessor 50. When the IS switch 51 is turned on, a vibration control circuit (not illustrated) is allowed to be used. On the other hand, when the IS switch 51 is turned off, the vibration control circuit is not allowed to be used.

An AF switch 52 is connected to the lens control microprocessor 50. When the AF switch 52 is turned on, an AF control circuit (not illustrated) is allowed to be used. On the other hand, when the AF switch 52 is turned off, the AF control circuit is not allowed to be used.

Figure 2:
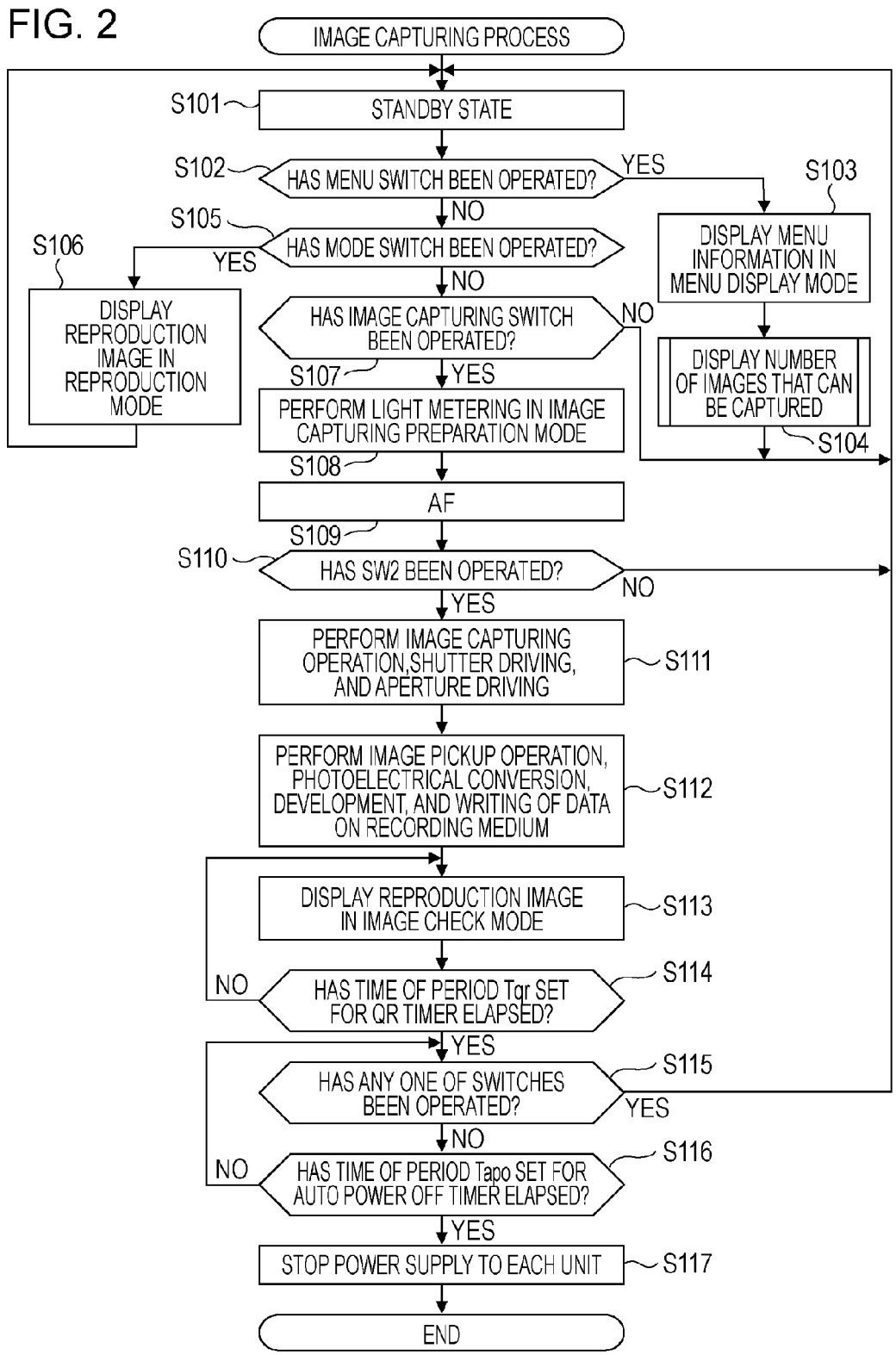
FIG. 2 is a flowchart illustrating an example image capturing process performed by the digital single-lens reflex camera illustrated in FIG. 1 according to an exemplary embodiment of the present invention.

FIG. 2 is a flowchart illustrating an example image capturing process performed by the digital single-lens reflex camera illustrated in FIG. 1 according to an exemplary embodiment of the present invention. This process is performed by the cameracontrol microprocessor 10 and the lens control microprocessor 50 which are illustrated in FIG. 1.

Referring to FIG. 2, in step S101, a switch standby state is set. In step S102, it is determined whether the menu switch 40 has been pressed. If it is determined that the menu switch 40 has been pressed by a photographer, the process proceeds to step S103. On the other hand, if it is determined that the menu switch 40 has not been pressed by the photographer, the process proceeds to step S105.

In step S103, a menu display mode is set in which menu information is displayed on the display unit 30. The menu information includes a plurality of menus used for the setting of image capturing conditions, for example, an exposure mode (manual, auto (program image capturing), aperture priority, shutter speed priority, etc.), a focus mode (autofocus, manual focus, etc.) and a drive mode (image capturing of a single image and continuous image capturing). A user can select one of these choices in each mode.

Furthermore, a plurality of pieces of information affecting a battery residual capacity are also displayed. For example, information about which of an image capturing mode and a reproduction mode is used, information about an attached interchangeable lens, information about an inserted image recording medium, and timer setting information are displayed. The amount of current consumption of the camera is displayed on the basis of these pieces of information.

Subsequently, in step S104, the number of images that can be captured is displayed.

Figure 3:
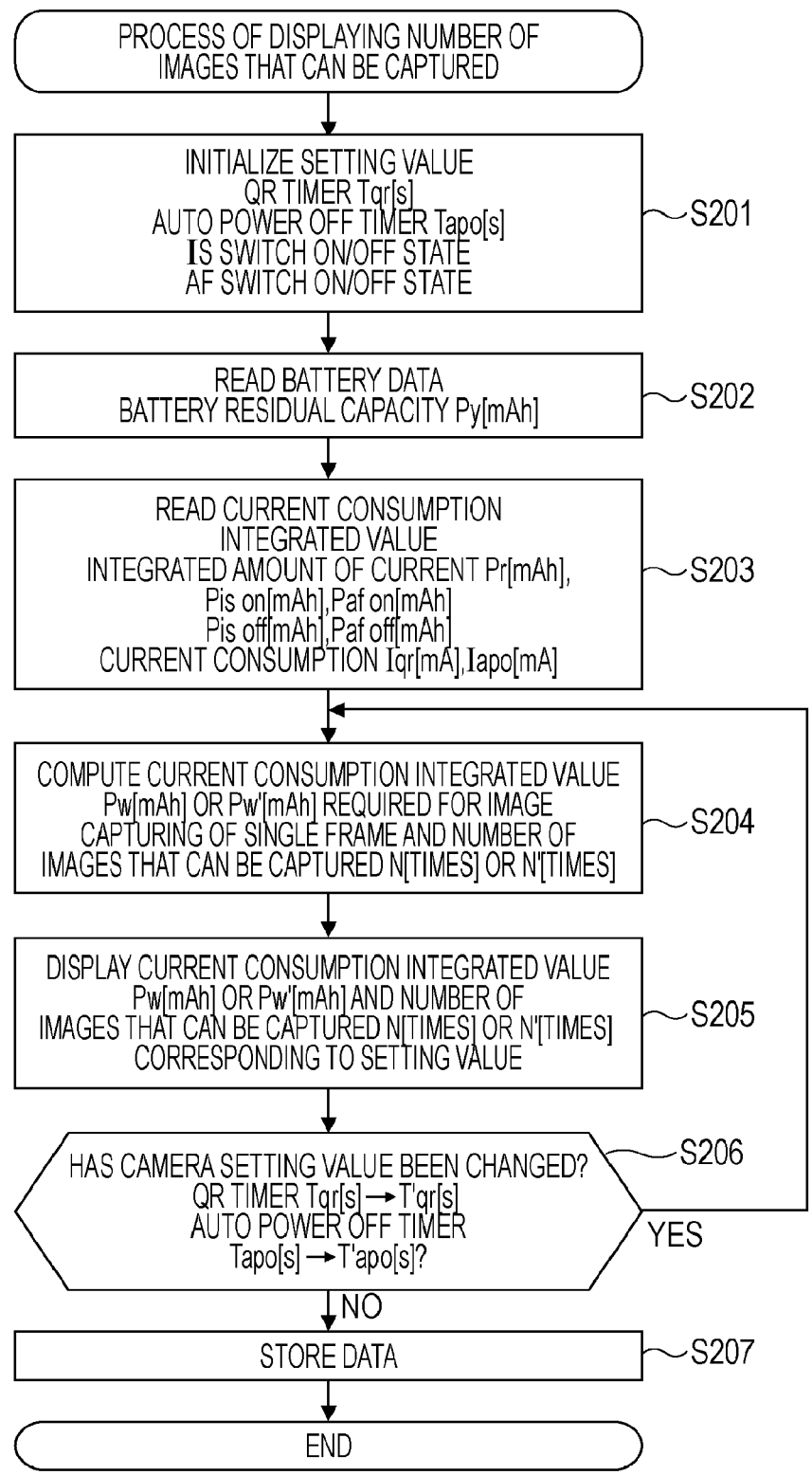
FIG. 3 is a flowchart illustrating an example process of displaying the number of images that can be captured which is performed in step S104 illustrated in FIG. 2 according to an exemplary embodiment of the present invention.

FIG. 3 is a flowchart illustrating an example process of displaying the number of images that can be captured which is performed in step S104 illustrated in FIG. 2 according to an exemplary embodiment of the present invention.

In this process of displaying the number of images that can be captured in step S104, the number of images that can be captured is computed and is then displayed as available power of a battery.

Referring to FIG. 3, in step S201, the cameracontrol microprocessor 10 initializes camera operation setting values, and reads pieces of menu setting information from the storage unit 12. For example, the pieces of menu setting information, which can be set by a photographer, are information about a display period Tqr[s] of quick review (function of displaying the last captured image after image capturing) and information about a period of time Tapo[s] set for an auto power off timer. The camera operation setting values are, for example, a setting value representing information about whether the IS switch 51 is in the ON or OFF state and a setting value representing information about whether the AF switch 52 is in the ON or OFF state.

Subsequently, in step S202, the cameracontrol microprocessor 10 reads pieces of battery data from the current integrating unit 21. For example, the pieces of battery data are data of the total battery capacity Ps[mAh], data of a battery residual capacity Py[mAh], data of a battery voltage Vbat[v], and data of a battery current Ibat[mA].

The current integrating unit 21, which is connected to a circuit included in the camera, measures a current supplied from the battery 20 and computes a current consumption integrated value on the basis of the power consumption period and the measured current. The cameracontrol microprocessor 10 stores the current consumption integrated value in the storage unit 12.

In step S203, the cameracontrol microprocessor 10 reads the current consumption integrated value from the storage unit 12. Examples of the current consumption integrated value include the integrated amount Pr[mAh] of a current required for an exposure operation, the integrated amount Pison[mAh] of a current when the IS switch 51 is in the ON state, the integrated amount PAFon[mAh] of a current when the AF switch 52 is in the ON state, the integrated amount Pisoff[mAh] of a current when the IS switch 51 is in the OFF state, and the integrated amount PAFoff[mAh] of a current when the AF switch 52 is in the OFF state. Furthermore, in step S203, the cameracontrol microprocessor 10 reads a current consumption value Iqr[mA] per unit time in the quick review mode and a current consumption value Iapo[mA] per unit time in the switch standby state.

For example, if the IS switch 51 is in the ON state and the AF switch 52 is in the ON state, the integrated amount Pison [mAh] of a current when the IS switch 51 is in the ON state and the integrated amount PAFon[mAh] of a current when the AF switch 52 is in the ON state are to be used for computation.

On the other hand, if the IS switch 51 is in the OFF state and the AF switch 52 is in the OFF state, the integrated amount Pisoff[mAh] of a current when the IS switch 51 is in the OFF state and the integrated amount PAFoff[mAh] of a current when the AF switch 52 is in the OFF state are to be used for computation.

In step S204, the cameracontrol microprocessor 10 computes an integrated value Pw[mAh] of current consumption required for image capturing of a single frame and the number of images that can be captured N[times] on the basis of the camera operation setting value data and the stored current consumption integrated value which have been obtained in steps S202 and S203.

For example, if the IS switch 51 is in the ON state and the AF switch 52 is in the ON state, the integrated value Pw[mAh] of current consumption required for image capturing of a single frame is obtained as follows.

It is assumed that the integrated amount of a current required for the exposure operation is Pr[mAh], the integrated amount of a current in the quick review display mode is Iqr[mA]×Tqr[s]/3600, the integrated amount of a current in the switch standby state is Iapo[mA]×Tapo[s]/3600, the integrated amount of a current required for the IS operation is Pison[mAh], and the integrated amount of a current required for the AF operation is PAFon[mAh]. The current consumption integrated value Pw[mAh] is obtained by adding these integrated amounts of a current.

$$Pw[mAh]=Pr[mAh]+Iqr[mA]\times Tqr[s]/3600+Iapo[mA]\times Tapo[s]/3600+Pison[mAh]+PAFon[mAh]$$

The number of images that can be captured N[times] is calculated as follows.

$$N[times]=Py[mAh]/Pw[mAh]$$

Pw[mAh]: the integrated value of current consumption required for image capturing of a single frame
Py[mAh]: the battery residual capacity In step S205, the camera operation setting value data, the integrated value Pw[mAh] of current consumption required for image capturing of a single frame, and the number of images that can be captured N[times] are displayed on the display unit 30.

For example, FIG. 4A illustrates a display example when the IS switch 51 is in the ON state and the AF switch 52 is in the ON state. Here, if a photographer changes the settings, the camera consumption power and the estimated number of images that can be captured are changed.

In step S206, it is determined whether a photographer can change the settings of the menu information by operating an operation member such as an electronic dial (not illustrated) or a set button switch (not illustrated).

For example, it can be considered that a photographer changes the settings such that the IS switch 51 is in the OFF state, the AF switch 52 is in the OFF state, and the quick review display period is set to a predetermined value Tqr'[s] different from Tqr[s].

Thus, if a photographer has changed the settings, the process returns to step S204 in which computation is performed again. On the other hand, if the photographer has not changed the settings, the process proceeds to step S207.

The integrated value Pw'[mAh] of current consumption required for image capturing of a single frame is obtained as follows. It is assumed that the integrated amount of a current required for the exposure operation is Pr[mAh], the integrated amount of a current in the quick review display mode is Iqr[mA]×Tqr'[s]/3600, the integrated amount of a current in the switch standby state is Iapo[mA]×Tapo[s]/3600, the integrated amount of a current required for the IS operation is Pisoff[mAh], and the integrated amount of a current required for the AF operation is PAFoff[mAh]. The current consumption integrated value Pw'[mAh] is obtained by adding these integrated amounts of a current.

$$Pw'[mAh]=Pr[mAh]+Iqr[mA]\times Tqr'[s]/3600+Iapo[mA]\times Tapo[s]/3600+Pisoff[mAh]+PAFoff[mAh]$$

The number of images that can be captured N'[times] is calculated as according to the equation shown herein below.

$$N'[times]=Py[mAh]/Pw'[mAh]$$

Pw'[mAh]: the integrated value of current consumption required for image capturing of a single frame Subsequently, in step S205, the camera setting values set by the photographer, the current consumption integrated value Pw'[mAh] that has bee recalculated on the basis of the camera setting values, and the number of images that can be captured N'[times] are displayed on the display unit 30.

For example, FIG. 4B illustrates a display example obtained when the photographer has changed the settings such that the IS switch 51 is in the OFF state, the AF switch 52 is in the OFF state, and a predetermined value Tqr'[s] different from the value Tqr[s] is set for the QR timer.

If the photographer does not change the settings in step S206, the process proceeds to step S207. In step S207, the menu information obtained after the photographer has changed the settings is stored in the storage unit 12. The number of images that can be captured is displayed and then the process returns to the flowchart illustrated in FIG. 2.

Referring back to FIG. 2, in step S105, if the photographer turns on the mode switch 41, the process proceeds to step S106 in which a reproduction mode is set. On the other hand, if the photographer does not turn on the mode switch 41, the process proceeds to step S107.

In the reproduction mode set in step S106, reproduction image data is generated from image information recorded on the recording medium, and a reproduction image is displayed on the display unit 30 using the generated reproduction image data. The photographer can change the reproduction image by operating the electronic dial or the like.

The image capturing switch 42 may be a two-step push switch connected to the cameracontrol microprocessor 10. And in step S107, if the photographer turns on a first-step switch SW1 of the image capturing switch 42, the process proceeds to step S108 in which an image capturing preparation mode is set. On the other hand, if the first-step switch SW1 is not pushed, the process returns to step S101 in which the camera is switched into the standby state.

In the image capturing preparation mode in step S108, a light metering circuit (not illustrated) is driven and the luminance of a field is measured, whereby light metering control data is obtained.

Subsequently, the process proceeds to step S109 in which a ranging circuit (not illustrated) is driven and the distance between the camera and a subject is computed on the basis of the output of the ranging circuit, whereby AF data (autofocus data) is obtained.

In step S110, if the cameracontrol microprocessor 10 detects that a second-step switch SW2 of the image capturing switch 42 has been pushed, the process proceeds to step S111 in which a release operation is performed. On the other hand, if the second-step switch SW2 is in the OFF state, the process returns to step S101 in which the camera is switched into the standby state.

In step S111, the cameracontrol microprocessor 10 calculates the control amount of a shutter and the control amount of a lens aperture on the basis of the above-described light metering control data and the above-described AF data, and drives a shutter control unit. Furthermore, the camera control microprocessor 10 transmits information about the control amount of the lens aperture and information about the light metering control amount to the lens control microprocessor 50 so as to drive the lens aperture.

In step S112, in an image pickup circuit, the shutter and the aperture are driven so as to cause an image pickup device to convert light received into an electrical signal. The electrical signal undergoes image processing and is then recorded on the recording medium as image data.

If an image check mode is set in the camera, the process proceeds to step S113 in which a reproduction image is displayed. More specifically, the camera control microprocessor 10 generates display data on the basis of the image data obtained after the image processing, and displays the generated display data on the display unit 30.

In the image check mode in step S114, if a period of time Tqr set for the QR timer has elapsed from the display start time of the reproduction image, the process proceeds to step S115 in which a switch standby state is set. On the other hand, if the period of time Tqr has not elapsed, the process returns to step S113 in which the reproduction image is continuously displayed.

Subsequently, in the switch standby state in step S115, it is determined whether any one of the above-described camera operating switches has been operated. If any one of these switches has been operated, the process returns to step S101 from which the process corresponding to the operated switch is started.

In step S116, if no operating switches have been operated and the period of time Tapo set for the auto power off timer has elapsed, the process proceeds to step S117. In step S117, the power is turned off and the power supply to each unit is stopped. Thus, the process ends.

In this embodiment, if a photographer changes a camera mode used and some of setting values of additional functions, the amount of power used is calculated by adding stored integrated values of power consumption (the product of a current consumption value and a power consumption period) obtained in individual modes. Subsequently, the available power consumption is computed on the basis of the difference between the total capacity of the battery and the amount of power used. The computed available power consumption is divided by the amount of power consumption required for image capturing of a single frame. The quotient is displayed as the number of images that can be captured.

The amount of power consumption of a camera is changed in accordance with a mode used such as an image capturing mode or a reproduction mode, or settings desired by a photographer such as the type of an attached interchangeable lens, the replacement of an image capturing recording medium, and the setting of a timer.

In this embodiment, the amount of power consumption of a battery is measured in accordance with a camera usage pattern, and the measured power consumption amount of the battery is stored in association with the setting state of an additional function. The number of images that can be captured is computed on the basis of the stored power consumption amount of the battery. Thus, the counting and display of the number of images that can be captured, which represents available power of the battery, can be accurately performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-016509 filed Jan. 26, 2007, which is hereby incorporated by reference herein in its entirety.

What is claimed is:

1. An image pickup apparatus comprising:
   an additional function setting unit configured to turn on or off an additional function of the image pickup apparatus;
   a computing unit that (a) computes a first current consumption integrated value required for capturing a single image when the additional function is on, (b) computes, using the first current consumption integrated value and a remaining capacity of a battery, the number of images that can be captured by the image pickup apparatus, (c) computes a second current consumption integrated value required for capturing a single image when the additional function is off, and (d) computes, using the second current consumption integrated value and the remaining capacity of the battery, the number of images that can be captured by the image pickup apparatus; and
   a display unit that (a) displays first battery information when the additional function is on and (b) displays second battery information when the additional function is off, wherein the first battery information includes first information corresponding to the first current consumption integrated value computed by the computing unit, second information corresponding to the number of images computed by the computing unit using the first current consumption integrated value and the remaining capacity of the battery, and third information corresponding to the remaining capacity of the battery, and wherein the second battery information includes fourth information corresponding to the second current consumption integrated value computed by the computing unit, fifth information corresponding to the number of images computed by the computing unit using the second current consumption integrated value and the remaining capacity of the battery, and sixth information corresponding to the remaining capacity of the battery.

2. The image pickup apparatus according to claim 1, wherein the additional function includes one of a vibration control and an autofocus control.

3. A method of controlling an image pickup apparatus, the method comprising:
   turning on or off an additional function of the image pickup apparatus;
   causing a computing unit of the image pickup apparatus to compute a first current consumption integrated value required for capturing a single image when the additional function is on;
   causing the computing unit to compute, using the first current consumption integrated value and a remaining capacity of a battery, the number of images that can be captured by the image pickup apparatus;
   causing the computing unit of the image pickup apparatus to compute a second current consumption integrated value required for capturing a single image when the additional function is off;
   causing the computing unit to compute, using the second current consumption integrated value and the remaining capacity of the battery, the number of images that can be captured by the image pickup apparatus;
   causing a display unit of the image pickup apparatus to display first battery information, wherein the first battery information includes first information corresponding to the first current consumption integrated value computed by the computing unit, second information corresponding to the number of images computed by the computing unit using the first current consumption integrated value and the remaining capacity of the battery, and third information corresponding to the remaining capacity of the battery; and causing the display unit of the image pickup apparatus to display second battery information when the additional function is off, wherein the second battery information includes fourth information corresponding to the second current consumption integrated value computed by the computing unit, fifth information corresponding to the number of images computed by the computing unit using the second current consumption integrated value and the remaining capacity of the battery, and sixth information corresponding to the remaining capacity of the battery.

4. The method according to claim 3, wherein the additional function includes one of a vibration control and an autofocus control.

* * * * *